United States Patent [19]

Minami et al.

[11] Patent Number: 5,415,804

[45] Date of Patent: May 16, 1995

[54] WATER-DISPERSIBLE COMPLEX AND A PROCESS FOR THE PRODUCTION THEREOF

[75] Inventors: Yoshinobu Minami; Hiroto Miyamoto, both of Miyazaki, Japan

[73] Assignee: Asahi Kasei Kogyo Kabushiki Kaisha, Osaka, Japan

[21] Appl. No.: 954,034

[22] Filed: Sep. 30, 1992

[30] Foreign Application Priority Data

Sep. 30, 1991 [JP] Japan .................. 3-251197

[51] Int. Cl.$^6$ .......... B01F 3/12; B01J 13/00; C09K 3/00
[52] U.S. Cl. .......... 252/363.5; 106/163.1; 106/197.2; 252/311; 252/314; 252/315.3; 426/456; 426/473; 426/658
[58] Field of Search ........ 252/311, 314, 315.3, 252/363.5; 426/456, 473, 658; 106/163.1, 197.2

[56] References Cited

U.S. PATENT DOCUMENTS

| | | | |
|---|---|---|---|
| 3,573,058 | 3/1971 | Tiemstra | 426/658 |
| 3,850,838 | 11/1974 | Guckenberger et al. | 252/363.5 |
| 4,143,163 | 3/1979 | Hutchinson et al. | 426/456 X |
| 4,452,722 | 6/1984 | Turbak et al. | 252/311 |
| 4,839,166 | 6/1989 | Grollier et al. | 252/315.3 X |
| 5,011,701 | 4/1991 | Baer et al. | 426/573 |
| 5,110,525 | 5/1992 | Kolsky et al. | 252/363.5 X |
| 5,123,962 | 6/1992 | Komuro et al. | 106/163.1 |

FOREIGN PATENT DOCUMENTS

| | | |
|---|---|---|
| 0415193 | 8/1990 | European Pat. Off. . |
| 1565494 | 2/1968 | France . |
| 0138153 | 10/1979 | Japan .................. 426/658 |
| WO9014017 | 11/1990 | WIPO . |
| 9102461 | 3/1991 | . |

OTHER PUBLICATIONS

Flow of Gels of Cellulose Microcrystals, Jan Hermans, Jr., *Journal of Polymer Science: Part C*, No. 2, pp. 129–144 (1963).

Microcystalline Cellulose, O. A. Battista, P. A. Smith, *Industrial And Engineering Chemistry*, vol. 54, pp. 20–29 (1962).

*Primary Examiner*—Richard D. Lovering
*Attorney, Agent, or Firm*—Sughrue, Mion, Zinn, Macpeak & Seas

[57] ABSTRACT

A water-dispersible complex comprising from 50 to 98% fine cellulose particles and from 2 to 50% water-soluble gum and/or hydrophilic material, as solid component ratio by weight. An aqueous dispersion of this complex includes particles having a particle size of at least 10 μm, in a particle size distribution of not more than 40%. The aspect ratio in terms of the particles having a particle size of at least 10 μm is not higher than 3.0 when the ratio of the particles having a particle size of at least 10 μm in the particle size distribution is from 5 to 40%, and has the colloid fraction of at least 65%.

9 Claims, 4 Drawing Sheets

WATER-DISPERSIBLE COMPLEX AND A PROCESS FOR THE PRODUCTION THEREOF

FIELD OF THE INVENTION

The present invention relates to a water-dispersible complex from which a cellulose colloid can be obtained and a method of producing that complex. More particularly, it relates to a water-dispersible complex capable of being utilized as a stabilizer such as a suspension stabilizer, an emulsion stabilizer, a thickening stabilizer, as well as a texture-imparting agent, a clouding agent, an abrasive, a dietary fiber, a fat and oil substitute, etc., in a wide variety of industrial products such as foods, medicaments, cosmetics, coating materials, ceramics, resins, catalysts, etc. The invention also relates to a method of producing such a water dispersible complex.

BACKGROUND OF THE INVENTION

Fine particles of cellulose exist in water in a colloidal state and show properties of various stabilizers and body imparting agents as disclosed in *Industrial And Engineering Chemistry*, vol.54, pp.20–29 (1962). That is, the fine cellulose particles have a number of hydroxyl groups on the surface thereof, which hydroxyl groups provide a hydrate structure to give a stable colloidal cellulose when dispersed in water.

An example of a water-dispersible complex utilizing this property of cellulose is described in JP-B-40-12174 (the term "JP-B" as used herein means an "examined published Japanese patent application"). There, an aqueous colloid dispersion is obtained by adding an interfering agent to a united body of cellulose crystallites. Also, JP-B-56-31094 and JP-B-57-14771 disclose a water-dispersible complex composed of a combination of fine crystal cellulose with a dispersing agent or a disintegrator. According to these conventional techniques, water dispersible complexes are obtained by mixing cellulose particles with a water-soluble polymer, saccharide, etc., in the presence of water, and then grinding the mixture, followed by drying and pulverizing the ground mixture.

However, the cellulose dispersion obtained from the complex thus prepared has an extremely sandy texture. Therefore, when this complex is used as a stabilizer for foods, etc., it is necessary to increase the addition amount thereof to obtain satisfactory performance as a colloid. As a result, the viscosity is increased because of a water-soluble polymer and original taste of the food is lost. Alternatively, the complex or the food to which the complex is added is treated with a homogenizer having a strong dispersing faculty. But, in this case, there is a restriction on the dispersing means employed and also there is a limit on the increase of the colloid performance.

Also, a dispersion obtained from the complex has a small colloid fraction and includes coarse particles because of an insufficient attrition effect on the cellulose particles. Therefore, there is the problem of precipitation of the coarse particles when the dispersion is used in materials having a relatively low viscosity, such as beverages. Also, a sandy feeling is caused in food additives wherein importance is attached to the taste of food. Moreover, there is a limitation on the use thereof in materials wherein a smooth aftertaste and apparent texture are required. Additionally, there is a problem of clogging fine pipes and screens during transporting the slurry.

Thus, efforts have been made to develop sufficiently fine cellulose particles to solve these problems. For example, EP-0415193A2 discloses a water dispersion of cellulose particles having an average particle size of not larger than 6 μm; WO-9102461 and U.S. Pat. No. 5,011,701 disclose a method for making fine cellulose particles for use in low-calorie cheese; and JP-B-62-30220 discloses a method for making uniform a suspension of fine cellulose crystalline.

However, in these techniques, the fine cellulose particles are stored and used in the form of an aqueous slurry, and hence there are large restrictions on the usage thereof. That is, there is the problem that microorganisms generate during storage. Transportation in the form of aqueous slurry is troublesome. Also, the aqueous slurry cannot be used at a high concentration. Thus, the techniques disclosed in the foregoing patents are unsatisfactory. When these fine cellulose particles are dried along with the aforementioned interfering agents, etc., to obtain a complex, a sufficient dispersion cannot be obtained when the complex is re-dispersed in water.

SUMMARY OF THE INVENTION

An object of the present invention is to provide a water-dispersible complex composed mainly of a cellulose, which is known to give a unique refreshing feeling as a taste improving agent of foods. The complex should be a dry product which is convenient for transporting and storage. It should give a smooth texture and form a colloid dispersion without a sandy feeling when dispersed in water.

According to studies by the present inventors, strong hydrogen bonds are formed between the surfaces of fine cellulose particles when the cellulose slurry is dried, providing a material firm in structure which cannot be re-dispersed in water. Also, it was confirmed that the finer cellulose particles, the firmer the structure of the material obtained, because fine cellulose particles move easily during drying and have a large surface area. Furthermore, it was confirmed that, in the conventional complexes aforementioned, the colloid fraction is less than 80%, the particles having a particle size of at least 10 μm constitute at least 30% of all the particles, and the aspect ratio (the ratio of a long diameter to a short diameter of the particles) is at least 3.8 with respect to the cellulose particles having a particle size (long diameter) of at least 10 μm.

As a result of investigations taking the above into consideration, it has been found that the aforementioned object can be achieved by uniformly dispersing (1) cellulose particles having a size, form and colloidal fraction which fall within specific ranges and (2) watersoluble gum and/or a hydrophilic material, and then drying the dispersion. This method is effective even if very fine particles are not employed, which require a considerable effort to prepare.

Accordingly, the present invention is a water-dispersible complex comprising from 50 to 98% by weight fine cellulose particles and from 2 to 50% by weight water-soluble gum and/or hydrophilic material, as solid component ratio by weight. The composition of the complex is such that: an aqueous dispersion of the complex comprises particles having a particle size of at least 10 μm in a particle size distribution of not more than 40%; the aspect ratio of the particles having a particle size of at least 10 μm is not higher than 3.0 when the ratio of the particles having a particle size of at least 10 μm in the particle size distribution is from 5 to 40%; and the dispersion has a colloid fraction of at least 65%.

BRIEF DESCRIPTION OF THE DRAWINGS

In FIGS. 3, "A" indicates the upper surface of the film and "B" indicates the lower surface of the film. In FIG. 5, "C" indicates the upper surface of the film.

In FIG. 8, "D" indicates the center portion of the powder.

DETAILED DESCRIPTION OF THE INVENTION

Figure 1:
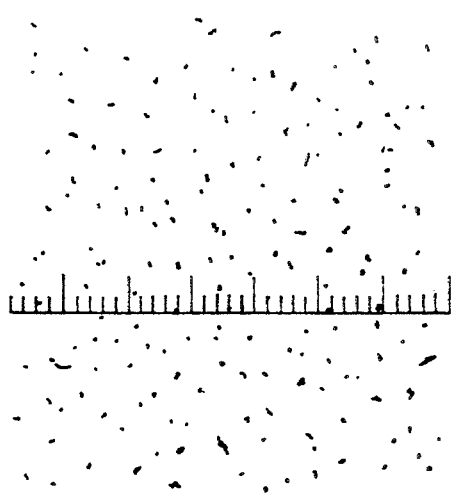
FIG. 1 is a schematic view showing the result of a microscopic observation of the aqueous dispersion obtained in Example 2, wherein the minimum scale is 10 μm.

There are two factors which influence the taste of a re-dispersed complex, i.e., "smoothness" and "sandiness". The term "smoothness" means that a sample dispersion uniformly has a fine texture so that one feels melting on the tongue as a creamy taste, the opposite of which is "roughness". On the other hand, the term "sandiness" means that the presence of grains is recognized in a sample dispersion and an extraneous feeling remains on the tongue as an aftertaste.

The main factors causing a sandy feeling in a cellulose particle dispersion are the amount of course particles and the form thereof. That is, a particularly strong sandiness may be felt when the content of particles having a particle size of at least 10 μm is over 5%. Also, even when the ratio of the cellulose particles having particles size of at least 10 μm is over 5%, a sandy feeling is not given if the aspect ratio of the particles having a particle size of at least 10 μm is not higher than 3.0. Furthermore, even when the aspect ratio of the particles having a particle size of at least 10 μm is not higher than 3.0, they give an extraneous feeling on the tongue of sandiness when the ratio of the particles having a particle size of at least 10 μm is higher than 40%.

On the other hand, the smooth feeling depends on the colloid fraction which is a practical characteristics for measuring colloidal cellulose.

That is, the colloid fraction of a cellulose dispersion in water of a water-dispersible complex of the present invention is at least 65% for obtaining a smooth texture therein. For removing a sandy feeling in the aqueous dispersion of the complex of the present invention, the ratio of the particles having a particle size of at least 10 μm in the particle size distribution is not more than 40% by volume, the aspect ratio of the particles having a particle size of at least 10 μm being not higher than 3.0 when the ratio of the particles having a particle size of at least 10 μm in the particle size distribution is 5 to 40%. In this case, the average particle size of the cellulose particles may be not more than about 8 μm. Furthermore, for effectively achieving the object of the present invention, it is preferable that the ratio of the particles having a particle size of at least 10 μm is not more than 5% and that the colloidal fraction is at least 80%. In this case, the average particle size of the cellulose particles may be not more than about 4 μm.

The term "colloid fraction" is the weight ratio (%) of the solid components in the dispersed phase wherein the solid components are floated and dispersed without being precipitated even when a definite centrifugal force is applied to an aqueous dispersion of a cellulose complex. That is, the colloid fraction is the ratio of the colloidal portion which can be stably dispersed in an aqueous dispersion and shows the faculty of dispersibility and stability for practical use. Also, the average particle size is the particle size of 50% of the integrated volume by a laser method and the ratio of the particle having a particle size of at least 10 μm shows a ratio (%) in the volume distribution. These measurement methods are described in detail in the examples set forth below.

The cellulose particles to be used in the present invention have a colloid fraction of at least 50%, wherein the ratio of the particles with a particle size of at least 10 μm is not more than 40%, preferably not more than 5%, the aspect ratio of the particles having a particle size of at least 10 μm being not higher than 3.0 when the ratio of the particles with a particle size of at least 10 μm is 5 to 40%. With respect to the average particle size of such cellulose particles, it is generally not more than about 8 μm, preferably 4 μm.

The fine cellulose particles can be obtained by subjecting cellulose materials such as wood pulp and purified linter to a depolymerization treatment such as acid hydrolysis, alkali oxidation-decomposition, enzyme decomposition, or steam explosion decomposition, to provide a cellulose having an average polymerization degree of from 30 to 375 and wet-grinding the cellulose by applying thereto a mechanical shear. The wet-ground cellulose can be further subjected to a fractional treatment by centrifugal sedimentation to collect the colloidal portion.

The wet-grinding machines suitably used in the present invention include medium mills such as a wet vibration mill, a wet planetary vibration mill, a wet ball mill, a wet roll mill, a wet coball mill, a wet bead mill and a wet paint shaker, high-pressure homogenizers, and the like. Among the high-pressure homogenizers, those wherein the slurry is introduced into a fine orifice and made to collide against each other at a high flow rate, at a high pressure of at least about 500 kg/cm$^2$, are preferable.

From among the conventional wet-grinding machines illustrated above, a suitable machine can be selected depending on the physical properties required in the final product. For example, a medium mill is suitable for efficiently grinding a cellulose. On the other hand, if a high-pressure homogenizer is employed, the colloid fraction value of the dispersion of the cellulose fine particles obtained is increased to provide a smooth texture. For example, a colloid fraction of at least 50% in an aqueous dispersion can be obtained by first lowering the average particle size below 6 μm when a wet bead mill is employed, while the same fraction value can be achieved at the average particle size is about 8 μm with a high-pressure homogenizer.

Also, the particle form and viscosity of fine cellulose can be controlled by suitably selecting a grinder. For example, the aspect ratio of the particles having the particle size of at least 10 μm, which is the main factor causing a sandy feeling, is lower with a high-pressure homogenizer than with a wet bead mill. As to the viscosity, a higher viscosity is obtained with a high-pressure homogenizer than with a wet bead mill.

The foregoing grinding machines can be used solely, or can be used in a combination of two or more.

The optimum concentration during grinding using these mills depends upon the kind of the mill, but is generally from 2 to 25% in its solid component concentration, preferably from 5 to 15% for a medium mill and from 5 to 20% for a high-pressure homogenizer.

A water-soluble gum and/or a hydrophilic material are used in the present invention for preventing the re-aggregation of the fine cellulose particles by hydrogen bonding during drying. Thus, the water-dispersible complex of the present invention is easily returned to an initial colloid dispersion in water, that is, can be easily redispersed in water.

The water-soluble gum used in the present invention has a high water-swelling property and a good compatibility with cellulose in water. Examples include a locust bean gum, a guar gum, a tamarind gum, a quince seed gum, a karaya gum, a gum arabic, a tragacanth gum, a ghatti gum, arabinogalactan, agar, carrageenan, alginic acid and the salts thereof, farseleran, pectin, marmero, a xanthane gum, kardran, purulan, dextran, a geran gum, gelatin, cellulose derivatives such as sodium cellulose glycolate, etc.

Of these materials, sodium cellulose glycolate can be used solely since the material has both a swelling property and a hydrophilic property. However, it is desirable to use the other water-soluble gums together with a hydrophilic material, since a large addition amount thereof is required, resulting in the viscosity of the whole system being greatly increased. In view of the above, the content of water-soluble gums in the complex may be not more than 45%, preferably from 2 to 25%, by weight. Also, the ratio of the content of water-soluble gums to that of the hydrophilic materials may be 1/9 to 9/1.

The hydrophilic material used in the present invention has an excellent solubility in cold water and scarcely increases the viscosity of a dispersion system. Examples include hydrolyzed cereal solids; dextrins; water-soluble monosaccharides such as glucose, fruit sugar and xylose; water-soluble oligosaccharide such as sucrose, lactose, maltose, isomerized sugar, coupling sugar, parathinose, neosugar, mannitol, reduced starch saccharified wheat gluten, maltose, lactulose, polydextrose, fructoligosacchaside and galactoligosaccharide; sugar alcohols such as multitol, xylitol, mannitol and sorbitol; sorbose; and the like.

The water-soluble gum quickens the dispersion of the fine cellulose in water, improves the dispersion stability of the cellulose, and improves the colloid fraction as a protective colloid. Also, the hydrophilic material accelerates the dispersion of the cellulose in water, which acceleration effect can be improved when combined with water-soluble gum.

For increasing the colloid fraction in an aqueous dispersion of the complex and remarkably improving the dispersibility and stability thereof, it is preferred that the total amount of the water-soluble gums and/or the hydrophilic materials is from 2 to 50%, preferably 3 to 30%, based on the total weight of the complex. If the amount of the water-soluble gums and/or the hydrophilic materials is less than 2%, it is difficult to prevent the reaggregation of the cellulose particles caused by hydrogen bonding during the drying step. If the amount is over 50%, the viscosity of the complex dispersion increases as a result of the water-soluble gum to lower the taste of the food. Also, the faculty as a stabilizer is undesirably reduced with a lowering of the relative cellulose content.

The colloid fraction of the fine cellulose particles indicates the colloidal faculty of the cellulose itself when measured solely, while the colloid fraction of the complex is influenced to some extent by the viscosity and content of the water-soluble gum and/or the hydrophilic material. Generally, the water-dispersible complex has a colloidal fraction value higher than that of the fine cellulose as the main component thereof. That is, the smoothness of the texture of the re-dispersion of a complex is same as or greater than that of the fine cellulose as a raw material.

Whether or not the complex is completed may be confirmed by re-dispersing the dried complex in water to prepare a dispersion having the same particle size as that of the original cellulose and measuring the apparent viscosity of the dispersion. As compared with a simple mixture before the formation of the complex, the increase of the slurry viscosity is recognized as a result of the increase in the particle stability with the formation of the complex imparting body.

The colloid fraction value and the viscosity of an aqueous dispersion of water-dispersible complexes are generally in proportion to those of cellulose particles as a raw material, but they can be controlled by changing the water-soluble gums and/or hydrophilic materials. In the present invention, these properties of an aqueous dispersion of the complex can be determined according to the purpose of the final product. For example, in the case of a complex being added to food, a higher viscosity may result in a heavy taste.

For ensuring the re-dispersion of the water-dispersible complex in water, it is preferred that the dried product of the complex has a water-permeable pore structure having innumerable, network-form, fine cracks and voids inside thereof. The water-permeable pores may have openings of a width of from about at least 0.05 to 0.5 μm and it is preferable that intervals between the pores are 3 μm or less.

The complex of the present invention having the above pore structure is preferable for the following reason. In conventional complexes containing unground particles, the unground particles existing on the surface of the dried complex introduce water into the inside of the complex through capillary tubes of the unground particles themselves. Furthermore, the unground particles themselves fall off because of stirring during re-dispersing to form holes, which holes function to further permeate water into the inside of the dried particles.

On the other hand, in the water-dispersible complex of the present invention containing an extremely small amount of such unground particles, the foregoing water permeation effect by the unground particles can not be expected and thus it is preferable that the dried product has the specific water-permeating structure as described above.

The water dispersible complex of the present invention has a water content of from 2 to 20%, preferably 3 to 10%, based on the total weight of the complex. If the water content in the dried product is higher than 20%, there are problems with the inferior handling property, sticking, putrefaction, collapse of the pore structure from shear in the steps of drying, grinding, particle size control, and the like.

The water-dispersible complex of the present invention can be prepared by treating cellulose so that the colloid fraction is at least 50%, mixing the cellulose with a water-soluble gum and/or a hydrophilic material in water to prepare a slurry, and then drying the slurry. Alternatively, the cellulose after a depolymerization treatment can be mixed with a water-soluble gum and/or a hydrophilic material, the mixture can be ground by a wet type medium mill or a high-pressure homogenizer and dispersed to provide a slurry, and then the complex can be obtained by drying the slurry.

In any case, during mixing the cellulose particles with a water-soluble gum and/or a hydrophilic material and dispersing the mixture, care should be taken to sufficiently dissolve and to uniformly mix the water-soluble gum, in particular. For that purpose, it is preferred that the water-soluble components are mixed with sufficient stirring in water of at least 75% of the total weight of the slurry. It is possible that after previously dispersing the water-soluble components in a small amount of water, the dispersion is added to the residue water and mixed therein. A heating treatment at about from 40° to 90° C. may be an effective method for accelerating the dissolution and for accelerating the formation of the complex. In particular, in the case of using a xanthane gum or carrageenan, it is necessary that the slurry obtained is heat-treated for at least one minute (up to about 100 hrs.) at 60° C. or higher (up to about 200° C.) before or during the drying of the slurry.

Drying methods employed in the present invention include lyophilization, spray drying, and drying in a film form, preferably drying in a film form which can effectively provide the aforementioned pore structure. When a spray drying is employed, it is preferable to control the particle size of the sprayed particles to be small and to quicken the drying speed as fast as possible for stabilizing the re-dispersibility of the dried product. For example, preferred is a spraying condition in which the dried product has such particle size so that, when placed on a JIS (Japanese Industrial Standard) 100 mesh sieve, the particles remaining on the sieve are not more than 5% of the total particles. In a preferable drying condition, the difference between the temperature of the inlet for the hot blast and that of the outlet thereof can be at least 100° C., and the ratio of the amount of the blast for drying to that of the evaporated water can be about 150 $Nm^3/T$.

Drying the slurry in a film form can be carried out by casting a uniformly mixed slurry of the fine cellulose particles and the water-soluble gum and/or the hydrophilic material on a base material such as a glass sheet, a stainless steel plate, an aluminum plate and a nickel-chromium plated steel plate, followed by drying.

Casting the slurry when drying the complex in a film form is carried out, for example, by extruding the slurry from a slit, by applying the slurry with a roll or a brush, by blowing the slurry, by sinking a base material into the slurry and then taking it up, by placing an excess amount of the slurry on a base material and then blowing air thereon, or by transferring the slurry to a base material using a transferring roll.

The base materials on which the slurry is casted during drying in a film form may be previously heated. Alternatively, the casted film of the slurry may be heated by infrared rays, hot blast, high frequency, etc., after casting the slurry. The drying temperature is preferably about 15° to 200° C., more preferably 40° to 150° C. In the case of a system to which a xanthane gum or carrageenan is added, a drying temperature of at least 60° C. is preferred since the heat treatment of the system can be omitted.

The slurry when dried in a film form may have a concentration capable of spreading the slurry in a film form and there is no particular restriction thereon. However, the solid component concentration of the slurry is generally from about 1 to 30%, preferably 5 to 20%, in view of facilities in working to provide a good dried product. The thickness of cast film may be 0.1 to 10 mm, preferably 0.5 to 7 $\mu$m of the thickness of the slurry.

For industrial practice, a dryer such as a steel belt dryer, a drum dryer and a disk dryer can be employed for drying the slurry in a film form.

The product thus dried in a film form may then be peeled off with care so as not to destroy the pore structure of the film. Therefore, a drying condition is preferable whereby the dried film causes self-peeling because of the difference in shrinkage during drying between the upper side and the bottom side of the film. For that purpose, it is preferred that the base material has a smooth surface from which the film is easily peeled off or that the surface of the base material is subjected to a parting agent treatment, Teflon-coating, etc. A drying condition which can provide an excellent peeling ability of the dried film can be suitably selected depending, for example, on the complex system, on the slurry concentration, on the slurry viscosity, on the properties of the base material, and on the drying means. In general, the thicker the film, the better the peeling ability thereof.

The products dried in the film form include so-called film-form products as well as foil-form, thin piece-form, flake-form, linear-form, powder-form products, and the like.

The dried product obtained by the film-form drying method can be used as a product as it is. When the dried product is a bulky film because of compounding of the composition, slurry concentration, drying system, etc., the product may be subjected to a crushing treatment, which is preferably conducted in a mild manner to maintain the pore structure. As a crushing machine, an impact type crusher such as a hammer mill, a pin mill and a jet mill can be used, but these crushers tend to lower the re-dispersibility of the product. Accordingly, a cutter-type crusher with a low rotation number (e.g., 300 to 10,000 rpm), in particular, one having a sharp cutter which can be handled at a relatively low rotation number, is preferably used.

The water-dispersible complex of the present invention can be effectively used as an additive with various functions in the industrial fields of food, medicine, cosmetics, and the like. The content of the present complex during use may be 0.1 to 3% when used as a suspension stabilizer, 0.1 to 5% as an emulsion aid agent, 1 to 10% as a fat substitute, 0.1 to 3% as a suspension agent, 1 to 20% as a base for ointment, 0.5 to 50% as a disintegration aid agent, 0.5 to 80% as a liberation controlling agent, and 0.5 to 10% as an extrusion improving agent.

According to the water-dispersible complex of the present invention, a high colloid fraction of at least 65% can be achieved even in a low-viscosity complex system (with an apparent viscosity of 700 cps or lower in 3% aqueous dispersion). Furthermore, a very high colloid fraction of at least 80% can be achieved in a high-viscosity complex system (with an apparent viscosity of 700 cps or higher in 3% aqueous dispersion), which fraction value has not been obtained by any conventional complexes even having an apparent viscosity of 2,000 cps.

As is clear from the definition described above, the colloid fraction shows a performance capable of stably dispersing without causing precipitations in an aqueous dispersion. That is, the water-dispersible complex of the present invention having the foregoing colloid fraction has an excellent effect in the fields wherein a uniform dispersibility and stability over a period of long time are required, for example, as a suspension stabilizer, an emulsion stabilizer, a thickener stabilizer, a cloudy agent and the like. Also, when the complex is used for a texture imparting agent, a dietary fiber, etc., the complex gives a smooth and good texture.

Furthermore, in the present invention, cellulose particles are fine, the ratio of large particles is reduced, and the form of the particles is a roundish particle form. That is, the problem of a sandy feeling is solved to obtain a product having a good apparent texture. Additionally, the water-dispersible complex of the present invention can generate a large amount of colloid particles without using a specific dispersing means, whereby its performance as a stabilizer is remarkably improved and its field of use can be extended.

The present invention is described by the following examples in more detail. The measurement methods used in the examples and the comparative examples are described below.

Colloidal Fraction (1) A sample (0.75 g as the solid components) and distilled water are placed in an Ace Homogenizer (Type AM-T, made by Nippon Seiki K.K.) and the total amount is adjusted to 300 g;

(2) the sample is dispersed for 2 minutes at 15,000 r.p.m.;

(3) in a weighing bottle is placed 10 ml of the dispersion and the weight is measured;

(4) a residue dispersion is placed in a centrifugal tube and is subjected to a centrifugal separation for 15 minutes at 2,000 r.p.m. (Type H-300, made by Kokusan Enshinki K.K.) and 10 ml of the supernatant liquid is placed in a weighing bottle, and the weight is measured;

(5) the weighing bottles (3) and (4) are subjected to evaporation to dryness for 10 hours in an oven at 105° C.;

(6) the weight of the solid components of (3) is measured to obtain the value A;

(7) the weight of the solid components of (4) is accurately measured to obtain the value B; and (8) water-soluble components (sum of a water-soluble gum and a hydrophilic material) are corrected.

When the weight of the water-soluble components is S%, Colloid fraction $(\%) = (B-AS/100)/A(1-S/100) \times 100$.

Aggregate (1) A sample (3.0 g as solid components) and distilled water are placed in Ace Homogenizer (AM-T, made by Nippon Seiki K.K.) and the total weight is adjusted to 300 g;

(2) the sample is dispersed for 5 minutes at 15,000 r.p.m.; and (3) the dispersion is observed by an optical microscope (Nikon Optiphoto-pol) at 50 magnification.

Average Particle Size, Ratio of Particles of at least 10 μm (1) A sample (3.0 g as solid components) and distilled water are placed in Ace Homogenizer (AM-T, made by Nippon Seiki K.K.) and the total weight is adjusted to 300 g;

(2) the sample is dispersed for 5 minutes at 15,000 r.p.m.; and (3) the particle size distribution is measured using Horiba Laser Diffraction Type Particle Size Distribution Measuring Apparatus (LA-500).

The average particle size is the particle size of an integrated volume of 50% and the ratio of the particles having a particle size of at least 10 μm is shown by the ratio (%) in the volume distribution.

Aspect Ratio of Particles having Length of at Least 10 μm

In a photograph obtained by photographing a sample prepared under the same conditions as for the average particle size by an optical microscope or an electron microscope, the long diameter and the short diameter of the particles having a length of at least 10 μm are measured, and the ratio is obtained from the mean value of the measured values of at least 20 particles.

EXAMPLE 1

After finely cutting a commercially available dissolving pulp, the pulp was hydrolyzed in 10% hydrochloric acid at 105° C. for 20 minutes and the acid-insoluble residue obtained was filtered and washed to provide a cakey material having a water content of 60%. The cakey material was subjected to a grinding treatment for one hour by a planetary mixer. To the ground cakey material was added water, followed by dispersion by a homo mixer to provide a cellulose dispersion having a solid component ratio of 7%. The dispersion was subjected to a centrifugal separation for 5 minutes at 2,000 G, whereby a dispersion having a solid component ratio of 4.6% was obtained as the upper layer portion. The cellulose thus obtained by the fractional centrifugal treatment had a colloid fraction of 65% and a particle size of an integrated volume of 50% of 4.2 μm.

Then, an aqueous dispersion having a total solid component concentration of 3.5% composed of the cellulose having the colloid fraction of 65% thus obtained by the fractional centrifugal treatment, a xanthane gum (Bistop, trade name, made by Sanei Kagaku Kogyo K.K.) and a maltodextrin (Foodtex, trade name, made by Matsutani Kagaku Kogyo K.K.) in the compounding ratio of 75/5/20 by solid component ratio was prepared. The dispersion was heat-treated for 60 minutes at 80° C. with stirring and then spray-dried (tem. of dry hot blast: 230° C., tem. of exhaust air: 80° C., speed of slurry feeding: 6 kg/hr) to provide the dried powder of the water-dispersible complex.

The water content of the water-dispersible complex obtained was 5.1%, the colloid fraction when the complex was re-dispersed in water was 93%, the particle size of an integrated volume of 50% was 4.2 μm, and the ratio of the particles having a particle size of at least 10 μm was 4.5%.

EXAMPLE 2

After finely cutting a commercially available dissolving pulp, the pulp was hydrolyzed in 10% hydrochloric acid at 105° C. for 20 minutes and the acid-insoluble residue obtained was filtered and washed to provide a cellulose dispersion having a solid component ratio of 10%. The cellulose dispersion obtained was subjected to a pulverizing treatment by passing twice a medium stirring wet type pulverizing apparatus (Apex Mill Type AM-1, trade name, made by Kotobuki Giken Kogyo K.K.) using zirconia beads having a diameter of 1 mm and under the conditions of a stirring wing rotation number of 1,800 r.p.m. and a supplying amount of cellulose dispersion of 0.4 liter/min., to provide a pasty cellulose. The colloid fraction of the cellulose was 73% and the particle size of integrated volume of 50% was 3.1 μm.

Then, a dispersion having a total solid component concentration of 3.5% composed of the cellulose having the colloid fraction of 73% thus obtained, a xanthane gum (Bistop, trade name, made by Sanei Kagaku Kogyo K.K.) and glucose, having a compounding ratio of 75/5/20 by solid component content was prepared. The dispersion was heat-treated for 60 minutes at 80° C. with stirring and then spray-dried (tem. of dry hot blast: 230° C., tem. of exhaust air: 80° C., speed of slurry feeding: 6 kg/hr) to provide a dried powder of the water-dispersible complex.

The water content of the water-dispersible complex obtained was 5.3%, the colloid fraction when the complex was re-dispersed in water was 97%, the particle size of an integrated volume of 50% was 3.3 μm, and the ratio of the particles having a particle size of at least 10 μm was 1.5%.

Also, when the aqueous dispersion was observed by microscope, the cellulose particles were uniformly dispersed and aggregations of coarse particles were not observed. The schematic view of the dispersion observed by the microscope is shown in FIG. 1, wherein the minimum scale is 10 μm.

EXAMPLE 3

A dispersion having a total solid component concentration of 5.0% composed of the cellulose having a colloid fraction of 73% obtained in Example 2 and CMC-Na (carboxymethyl cellulose sodium) (Celogen, trade name, made by Dai-Ichi Kogyo Seiyaku Co., Ltd.) having a compounding ratio of 89/11 by solid component content was prepared. The dispersion was heat-treated for 30 minutes at 80° C. with stirring and spray-dried (tem. of dry hot blast: 230° C., tem. of exhaust air: 80° C., speed of slurry feeding: 6 kg/hr) to provide a dried powder of the water-dispersible complex.

The water content of the water-dispersible complex obtained was 4.8%, the colloid fraction when the complex was re-dispersed in water was 92%, the particle size of an integrated volume of 50% was 3.1 μm, and the ratio of the particles having a particle size of at least 10 μm was 1.5%.

EXAMPLE 4

A dispersion having a total solid component concentration of 10.5% composed of the cellulose having a colloid fraction of 73% obtained in Example 2 and CMC-Na (carboxymethyl cellulose sodium) (Celogen, trade name, made by Dai-Ichi Kogyo Seiyaku Co., Ltd.), having a compounding ratio of 95/5 by solid component content was prepared. The dispersion was casted in a thickness of 3 mm on an aluminum plate by means of an applicator and dried by an oven dryer for 60 minutes at 80° C. to form a dry film having a thickness of about 70 μm.

When the dry film was observed by electron microscope, fine cellulose particles were exposed on the surface thereof and innumerable gaps were observed. Also, on a cross section were distributed fine holes having a width of from 0.05 to 0.5 μm with an interval of about 1 μm or less in network form in the whole system.

Figure 3:
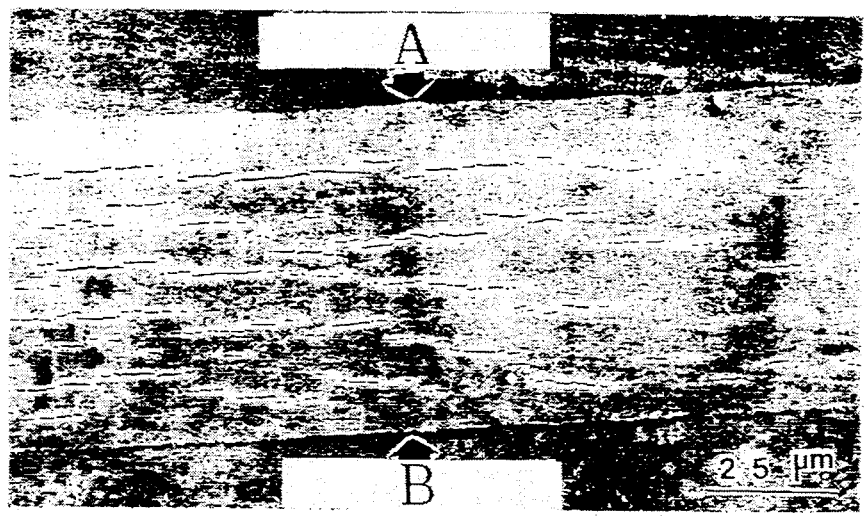
FIGS. 3 to 5 are photographs obtained by a scanning type electron microscope showing the cross section, the surface and the cross section, respectively, of the film obtained in Example 4.
Figure 4:
Figure 5:
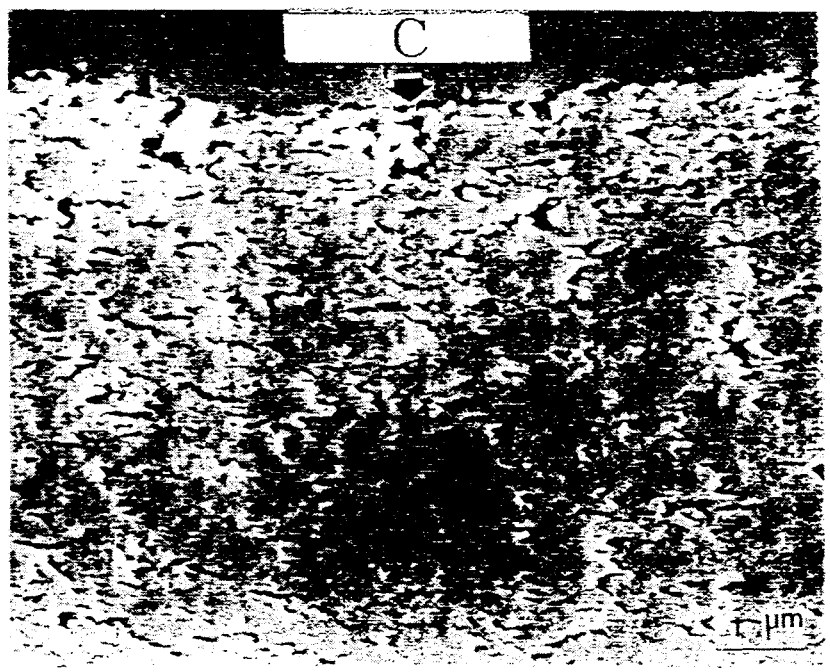

The results obtained by photographing the surface and a cross section of the film by a scanning type electron microscope are shown in FIG. 3, FIG. 4, and FIG. 5.

Furthermore, the dispersion having a total solid component concentration of 10.5% was dried in film form to 50 μm in thickness by a drum dryer (Type KDD-1, made by K.K. Kusuki Kikai Seisakusho) at a steam pressure of 1.8 kg/cm² and a rotation number of 1.5 r.p.m. to provide dried powder of the water-dispersible complex.

The water-dispersible complex obtained had a water content of 5.3% and was in a thin piece-form and flaky powder. When the powder was observed by electron microscope, fine cellulose particles were observed on the surfaces and innumerable gaps were observed between the fine cellulose particles. Also, on a cross section were distributed fine holes having a width of from 0.05 to 0.5 μm with an interval of from about 0.5 to 2 μm in the whole system. When the complex powder was re-dispersed in water, the colloid fraction was 85%, the particle size of an integrated volume of 50% was 3.1 μm, the ratio of the particles having a particle size of at least 10 μm was 1.5%, and the aqueous 5% dispersion thereof had smooth taste for food with no sandy feeling.

EXAMPLE 5

A dispersion having a total solid component concentration of 8.0% composed of the cellulose having a colloid fraction of 73% obtained in Example 2, a xanthane gum (Bistop, trade name, made by Sanei Kagaku Kogyo K.K.) and a hydrolyzed cereal solid (Paindex, trade name, made by Matsutani Kagaku Kogyo K.K.), having a compounding ratio of 75/5/20 by solid component content was prepared. Then, after treating the surface of a drum dryer (Type KDD-1, made by K.K. Kusuki Kikai Seisakusho) with a silicone releasing agent for food, the pasty composition obtained in the above step was dried by the drum dryer at a steam pressure of 1.2 kg/cm² and at a rotation number of 1.0 r.p.m. to provide a film-form complex.

The water content of the complex obtained was 5.3% and when the film was observed by electron microscope, the complex had almost the same structure as the complex in Example 4. Also, when the complex was re-dispersed in water, the colloid fraction was 97%, the particle size of an integrated volume of 50% was 2.8 μm, the ratio of the particles having a particle size of at least 10 μm was 1.0%, and the aqueous 5% dispersion of the complex had a smooth taste for food without showing a sandy feeling.

EXAMPLE 6

A dispersion having a solid component concentration of 8.0% composed of the cellulose having a colloid fraction of 73% obtained in Example 2, λ-carrageenan (CS-67, trade name, made by Sanei Kagaku Kogyo K.K.) and sorbitol, having a compounding ratio of 80/10/10 by solid component content was prepared. The dispersion was casted in a thickness of 3 mm on an aluminum plate by means of an applicator and dried by an oven dryer for 60 minutes at 80° C. to provide a film-form complex. Then, by finely cutting the complex to the size of 1,000 μm or below by means of a household food cutter to provide a thin piece-form and flaky powder.

The water content of the complex obtained was 4.5% and when the powder was observed by electron microscope, the complex had almost the same structure as that of the complex in Example 4. Also, when the complex was re-dispersed in water, the colloid fraction was 82%, the particle size of an integrated volume of 50% was 2.8 μm, the ratio of the particles having the particle sizes of at least 10 μm was 1.5%, and an aqueous 5% dispersion of the complex had a smooth taste for food without showing a sandy feeling.

EXAMPLE 7

After finely cutting a commercially available dissolving pulp, the pulp was hydrolyzed in 10% hydrochloric acid at 105° C. for 20 minutes and the acid-insoluble residue obtained was filtered and washed to provide a cellulose dispersion having a solid component content of 10%. The average particle size of the cellulose particles was 17 μm. The cellulose dispersion was subjected to a pulverizing treatment by passing the dispersion twice through a high-pressure pulverizing apparatus (Nanomizer Type LA-31, trade name, made by Nanomizer K.K.) at 1,300 kg/cm$^2$ to provide a pasty cellulose.

The colloid fraction of the cellulose was 80% and the particle size of an integrated volume of 50% was 6.5 μm.

Then, a dispersion having a solid component concentration of 7.0% composed of the cellose having the colloid fraction of 80% thus obtained, a xanthane gum (Bistop, trade name, made by Sanei Kagaku Kogyo K.K.), and a hydrolyzed cereal solid (Paindex, trade name, made by Matsutani Kagaku Kogyo K.K.), having a compounding ratio of 75/5/20 by solid component content was prepared. After treating the surface of a drum dryer (Type KDD-1, trade name, made by K.K. Kusuki Kikai Seisakusho) with a silicone releasing agent for food, the pasty composition thus obtained was dried by the drum dryer at a steam pressure of 1.5 kg/cm$^2$ and a rotation number of 1.0 r.p.m. to provide a film-form complex. Then, the complex was pulverized to the size of 1,000 μm or below by a cutting type pulverizer having knife-type edges to provide a thin piece-form and flaky powder.

The water content of the complex obtained was 5.7% and when the powder was observed by electron microscope, the complex had almost the same structure as that of the complex in Example 4. When the complex was re-dispersed in water, the colloid fraction was 75%, the particle size of an integrated volume of 50% was 6.5 μm, the ratio of the particles having a particle size of at least 10 μm was 22%, and the aspect ratio of the particles having a length of at least 10 μm was 2.0. The aqueous 5% dispersion thereof had smooth taste for food without showing a sandy feeling.

EXAMPLE 8

Using the cellulose dispersion having a solid component ratio of 10% obtained by hydrolyzing a commercially available dissolving pulp in Example 7 and CMC-Na (carboxymethyl cellulose sodium) (Celogen, trade name, made by Dai-Ichi Kogyo Seiyaku Co. Ltd.), a dispersion having a total solid component concentration of 10.0% of the cellulose dispersion and CMC-Na of a compounding ratio of 95/5 by solid component content was prepared. The dispersion was simultaneously subjected to a mixing, dispersing, and pulverizing treatment by passing it 5 times through a high-pressure pulverizer (Microfluidizer Type M-610, trade name, made by Microfluidics Co.) to provide a pasty composition.

Then, the pasty composition was adjusted to a total solid component concentration of 8.0% with water. After treating the surface of a drum dryer (Type KDD-1, made by K.K. Kusuki Kikai Seisakusho) with a silicone releasing agent for food, the composition was dried by the drum dryer at a steam pressure of 1.8 kg/cm$^2$ and a rotation number of 1.5 r.p.m. to provide a film-form complex. Then, the complex was pulverized to the size of 1,000 μm or below by a cutting type pulverizer having knife type edges to provide a thin piece-form and flaky powder.

The water content of the complex obtained was 5.2% and when the powder was observed by electron microscope, the complex had almost the same structure as that of the complex in Example 4. Also, when the complex was re-dispersed in water, the colloid fraction was 90%, the particle size of an integrated volume of 50% was 3.5 μm, and the ratio of the particles having a particle size of at least 10 μm was 2.0%. The aqueous 5% dispersion thereof had a smooth taste for food without showing a sandy feeling.

COMPARATIVE EXAMPLE 1

By following the same procedure as Example 2 except that a dispersion treatment for 60 minutes at 10° C. was carried out in place of the heat treatment for 60 minutes at 80° C., a dry powder of a complex was obtained.

Figure 2:
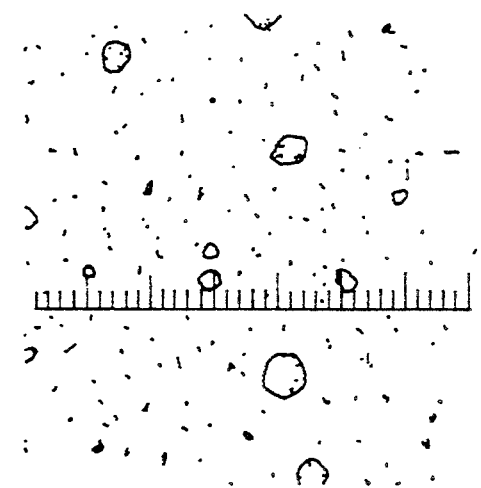
FIG. 2 is a schematic view showing the result of a microscopic observation of the aqueous dispersion obtained in Comparative Example 1, wherein the minimum scale is 10 μm.

The water content of the complex obtained was 5.5%. When the powder was re-dispersed in water, the colloid fraction was 88%, the particle size of an integrated volume of 50% was 22.0 μm, and the ratio of the particles having a particle size of at least 10 μm was 59%. Also, when the aqueous dispersion thereof was observed by microscope, coarse aggregations having an almost spherical form were observed. The schematic view thereof is shown in FIG. 2, wherein the minimum scale is 10 μm.

COMPARATIVE EXAMPLE 2

After finely cutting a commercially available dissolving pulp, the pulp was hydrolyzed in 10% hydrochloric acid at 105° C. for 20 minutes and the acid-insoluble residue obtained was filtered and washed to provide a cellulose dispersion having a solid component ratio of 10%. The cellulose dispersion was subjected to a pulverization treatment by passing the dispersion once through a media stirring wet pulverizer (Apex Mill Type AM-1, trade name, made by Kotobuki Giken Kogyo K.K.) using zirconia beads having a diameter of 1 mm as the media under the conditions of a stirring wing rotation number of 1,800 r.p.m. and supply amount of the cellulose dispersion of 0.4 liter/min. to provide a pasty cellulose. The colloid fraction of the cellulose was 47% and the particle size of an integrated volume of 50% was 6.5 μm.

A dispersion having a total solid component concentration of 10.5% of the cellulose having the colloid fraction of 47% thus obtained and CMC-Na (carboxymethyl cellulose sodium) (Celogen, trade name, made by Dai-Ichi Kogyo Seiyaku Co., Ltd.), having a compounding ratio of 95/5 by solid component content was prepared. The dispersion was casted in a thickness of 3 mm on an aluminum plate by an applicator and dried by an oven dryer for 60 minutes at 80° C. to provide a dry film having a thickness of about 70 μm.

The water content of the dry film obtained was 4.0% and when the film was re-dispersed in water, the colloid fraction was 60%, the particle size of an integrated volume of 50% was 6.7 μm, the ratio of the particles having a particle size of at least 10 μm was 26%, and the aspect ratio of the particles having a length of at least 10 μm was 6.5. The aqueous 5% dispersion thereof had a rough texture and showed a sandy feeling.

COMPARATIVE EXAMPLE 3

Figure 6:
FIGS. 6 to 8 are photographs obtained by a scanning type electron microscope showing the form, the surface and the cross section, respectively, of the powder obtained in Comparative Example 3.
Figure 7:
Figure 8:

The dry film having a thickness of about 70 μm obtained by the casting method in Example 4 was pulverized by an impact type pulverizer to provide a powder having a diameter of not larger than 150 μm. The results of photographing the surface and the cross section of the powder by a scanning type electron microscope are shown in FIG. 6, FIG. 7, and FIG. 8. As shown in the photographs, the network disposition of the cellulose is not seen on the surface, there are some gaps at the cross section, but the innumerable fine crack and gap structure seen before pulverizing was vanished. Also, when the aqueous dispersion of the powder was observed by an optical microscope, coarse aggregates were observed, the average particle size was 15 μm, and the ratio of the particles having a particle size of at least 10 μm was 45%.

COMPARATIVE EXAMPLE 4

By following the same procedure as Example 8 except that the dispersion was subjected to a mixing, dispersing, and pulverizing treatment by passing the dispersion once through a high-pressure pulverizer (Micro-fluidizer Type M-610, trade name, made by Microfluidics Co.) at 1,000 kg/cm$^2$, a complex was obtained.

The colloid fraction of the complex was 55%, the average particle size was 10 μm, and the ratio of the particles having a particle size of at least 10 μm was 51%. The aqueous 5% dispersion of the complex had rough texture and showed a sandy feeling.

Then, the products obtained by the examples and the comparative examples were tested on the texture thereof.

The texture test was made by 15 young women having no smoking habit. By re-dispersing each dried complex in water, an aqueous dispersion of 5% by weight of each complex was prepared and the texture test was carried out by a random test system.

Questions of 1) whether or not you felt "smoothness" and 2) whether or not you felt "sandiness" were asked of each panelist and the answers were collected. The results are shown in Table 1 below.

TABLE 1

|  | Example | | | | | | | | Comparative Example | | | |
| --- | --- | --- | --- | --- | --- | --- | --- | --- | --- | --- | --- | --- |
|  | 1 | 2 | 3 | 4 | 5 | 6 | 7 | 8 | 1 | 2 | 3 | 4 |
| Average Particle Size (μm) | 4.2 | 3.3 | 3.1 | 3.1 | 2.8 | 2.8 | 6.5 | 3.5 | 22 | 6.7 | 15 | 10 |
| +10 μm (%) | 4.5 | 1.5 | 1.5 | 1.5 | 1 | 1.5 | 22 | 2 | 59 | 26 | 45 | 51 |
| L/D of +10 μm | — | — | — | — | — | — | 2 | — | — | 6.5 | — | — |
| Colloid Fraction of Complex (wt %) | 93 | 97 | 92 | 85 | 97 | 82 | 75 | 90 | 88 | 60 | — | 55 |
| No. of Women felt smoothness *1 | 15 | 15 | 15 | 12 | 15 | 13 | 10 | 11 | 10 | 3 | 2 | 2 |
| No. of Women felt sandiness *2 | 1 | 0 | 0 | 0 | 0 | 3 | 3 | 1 | 12 | 15 | 11 | 12 |
| No. of Women answered indistinguishable | 0 | 0 | 0 | 3 | 0 | 0 | 3 | 4 | 3 | 0 | 4 | 3 |

*1, 2 Response may overlap.

COMPARATIVE EXAMPLE 5

The process described in JP-B-57-14771 was repeated using cellulose particles subjected to hydrolysis in the same manner as in Example 1 (particle size: 17.0 μm, colloid fraction: 12%).

That is, a mixture of wet crystal cellulose/karaya gum/dextrin in a ratio of 7/1/2 as a solid component by weight, wherein the water content was controlled to 50%, was kneaded and ground for 2 hours using a kneader. The ground mixture was then dried by an oven dryer and finely pulverized to provide a complex powder having a colloid fraction of 54%. Furthermore, even when the kneading and grinding were continued for an additional 3 hours, the colloid fraction was not improved.

As described above, the colloid dispersible complex of the present invention is a dry product convenient for transportation and storage and when the complex is dispersed in water, it gives a colloid dispersion texture which is smooth and gives no sandy feeling. This property is suitable for a fat substitute which is recently required for reducing fat of foods for health reasons, and simultaneously gives a good taste which has been required for many years.

Also, the colloid dispersing complex of the present invention has a greatly improved colloid fraction and is effective for uses requiring uniform dispersibility and stability over a period of long time, such as a suspension stabilizer, an emulsion stabilizer, a thickening stabilizer, a cloudy stability agent, etc., in foods, medicaments, cosmetics, coating materials, ceramics, resins, and other industrial products. Furthermore, the colloid dispersible complex of the present invention can generate a large amount of colloid particles without using a specific dispersing means, whereby the performance thereof as a stabilizer is greatly-improved and also the range of uses can be expanded.

For example, in the field of foods, the water-dispersible complex of the present invention can be used as a suspension stabilizer, an emulsion stabilizer, a thickening stabilizer, a foam stabilizer, a cloudy agent, a texture imparting agent, a fluidity improving agent, a form holding agent, a water release inhibitor, a dough improving agent, and a powdering base in favorite beverages such as a cocoa drink, a juice drink, a powdered green tea drink, Shiruko (adzuki-bean soup), etc.; milky beverages such as milk cocoa, milk coffee, an acidophilus drink, soybean milk, etc.; ice beverages such as ice cream, soft cream, sherbet, etc.; gelatinous foods such as custard pudding, jelly, jam, soft adzuki-bean jelly, etc.; milk shake, coffee whitener, whipped cream, mayonnaise, dressings, spreads, seasoning soy, soup, kneaded mustard, flower paste, food in a can, enteral nutrition, filling and topping for bread and cake, adzuki-bean jam cakes, fondant, processed marine product, breads, cakes, Japanese cakes, noodles, pasta, freezed dough, powdered fat, powdered perfume, powdered soup, powdered spice, cream powder, etc.

Furthermore, the complex of this invention can be used as a low calorie bases such as dietary fiber bases, fats and oils substitutes, etc., in the foregoing whole foods.

While the invention has been described in detail and with reference to specific embodiments thereof, it will be apparent to one skilled in the art that various changes and modifications can be made therein without departing from the spirit and scope thereof.

What is claimed is:

1. A dried and water-dispersible complex comprising from 50 to 98% by weight fine cellulose particles and from 2 to 50% by weight water-soluble gum and/or hydrophilic material which material is selected from the group consisting of hydrolyzed cereal solids, water-soluble saccharides and sugar alcohols, as a solid component ratio, wherein the composition of the complex is such that an aqueous dispersion of the complex comprises (i) particles having a particle size of at least 10 μm in a particle size distribution of not more than 5% by volume and (ii) a colloid fraction of at least 65%.

2. A dried and water-dispersible complex comprising from 50 to 98% by weight fine cellulose particles and from 2 to 50% by weight water-soluble gum and/or hydrophilic material which material is selected from the group consisting of hydrolyzed cereal solids, water-soluble saccharides and sugar alcohols, as a solid component ratio, wherein the composition of the complex is such that an aqueous dispersion of the complex comprises (i) particles having a particle size of at least 10 μm in the particle size distribution of not more than 40% by volume, said particles which have a particle size of at least 10 μm having an aspect ratio of not higher than 3.0, and (ii) a colloid fraction of at least 65%.

3. A dried and water-dispersible complex as in claim 1 or 2, wherein said colloid fraction is at least 80%.

4. A dried and water-dispersible complex as in claim 1 or 2, wherein said complex has a void structure having inside thereof water-permeable pores with openings of a width of from 0.05 to 0.5 μm with intervals between the pores of 3 μm or less in network form in the whole system.

5. A dried and water-dispersible complex as in claim 1 or 2, wherein said water-soluble gum is selected from the group consisting of sodium cellulose glycolate, xanthane gum, carrageenan, pectin, and Karaya and said hydrophilic material is selected from the group consisting of hydrolyzed cereal solids, water-soluble saccharides and sugar alcohols.

6. A process for producing a dried and water-dispersible complex, which comprises uniformly dispersing from 50 to 98% by weight fine cellulose particles having a colloid fraction of at least 50% and including not more than 5% of the particles with a particle size of at least 10 μm, and from 2 to 50% by weight water-soluble gum and/or a hydrophilic material which material is selected from the group consisting of hydrolyzed cereal solids, water-soluble saccharides and sugar alcohols, as solid component ratio in at least 75% by weight of water to form a slurry and then drying the slurry.

7. A process for producing a dried and water-dispersible complex, which comprises uniformly dispersing from 50 to 98% by weight fine cellulose particles having a colloid fraction of at least 50% and including not more than 40% of the particles with a particle size of at least 10 μm, said particles with a particle size of at least 10 μm having the aspect ratio of not higher than 3.0, and from 2 to 50% by weight water-soluble gum and/or a hydrophilic material which material is selected from the group consisting of hydrolyzed cereal solids, water-soluble saccharides and sugar alcohols, as solid component ratio, in at least 75% by weight of water to form a slurry and then drying the slurry.

8. A process as in claim 6 or 7, wherein the slurry is dried in the form of a film having a thickness of 10 mm or less.

9. A process as in claim 6 or 7, wherein the water-soluble gum is xanthane gum or carrageenan and the slurry is heat-treated at a temperature of at least 60° C.

* * * * *